US009740816B2

(12) United States Patent
He et al.

(10) Patent No.: US 9,740,816 B2
(45) Date of Patent: Aug. 22, 2017

(54) METHOD AND APPARATUS FOR NETWORK TRAFFIC SIMULATION

(71) Applicant: Huawei Technologies Co., Ltd., Shenzhen, Guangdong (CN)

(72) Inventors: Cheng He, Shenzhen (CN); Lujia Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 754 days.

(21) Appl. No.: 13/953,486

(22) Filed: Jul. 29, 2013

(65) Prior Publication Data
US 2013/0338990 A1 Dec. 19, 2013

Related U.S. Application Data

(63) Continuation of application No. PCT/CN2011/073333, filed on Apr. 26, 2011.

(51) Int. Cl.
 *H04L 12/24* (2006.01)
 *G06F 17/50* (2006.01)
 *H04L 12/26* (2006.01)
 *G06F 11/34* (2006.01)
 *H04L 29/06* (2006.01)

(52) U.S. Cl.
 CPC .......... *G06F 17/509* (2013.01); *H04L 41/145* (2013.01); *G06F 11/3447* (2013.01); *G06F 11/3457* (2013.01); *H04L 43/08* (2013.01); *H04L 63/1408* (2013.01)

(58) Field of Classification Search
None
See application file for complete search history.

(56) References Cited

U.S. PATENT DOCUMENTS

| 5,440,719 | A | * | 8/1995 | Hanes | G06F 11/3447 703/21 |
| 6,067,535 | A | * | 5/2000 | Hobson | G06N 3/02 706/10 |
| 6,725,263 | B1 | * | 4/2004 | Torres | H04L 41/147 370/234 |

(Continued)

FOREIGN PATENT DOCUMENTS

CN 1512717 A 7/2004

OTHER PUBLICATIONS

M. W. Garrett, W. Willinger "Analysis, modeling and Generation of Self-Similar VBR Video Traffic" pp. 269-280, 1994 ACM.*

(Continued)

*Primary Examiner* — Kibrom K Gebresilassie

(57) ABSTRACT

Embodiments of the present invention provide a method and an apparatus for network traffic simulation. The method includes: obtaining traffic information and user requirement information of a to-be-simulated IP network; analyzing the traffic information to generate a traffic characteristic; according to correspondence between user requirement information and traffic models, obtaining a traffic model corresponding to the user requirement information; and generating, through simulation, traffic of the to-be-simulated IP network according to the traffic characteristic and the traffic model. The embodiments of the present invention can improve flexibility and an emulation degree of traffic simulation.

15 Claims, 4 Drawing Sheets

(56) References Cited

U.S. PATENT DOCUMENTS

| | | | | | |
|---|---|---|---|---|---|
| 6,820,042 | B1* | 11/2004 | Cohen | | H04L 41/145 |
| | | | | | 702/179 |
| 7,774,440 | B1* | 8/2010 | Bagrodia | | H04L 41/0816 |
| | | | | | 703/1 |
| 7,822,837 | B1* | 10/2010 | Urban | | H04L 12/2602 |
| | | | | | 709/223 |
| 7,991,881 | B2* | 8/2011 | Qian | | H04L 12/2602 |
| | | | | | 370/229 |
| 8,631,136 | B2* | 1/2014 | Tennyson | | H04L 5/1446 |
| | | | | | 703/21 |
| 8,719,398 | B2* | 5/2014 | Qian | | H04L 41/5003 |
| | | | | | 370/250 |
| 8,903,696 | B2* | 12/2014 | Motel | | G06F 17/5022 |
| | | | | | 703/14 |
| 9,047,441 | B2* | 6/2015 | Xie | | G06F 21/00 |
| 2002/0165956 | A1* | 11/2002 | Phaal | | H04L 12/2697 |
| | | | | | 709/224 |
| 2004/0213221 | A1* | 10/2004 | Civanlar | | H04L 12/5695 |
| | | | | | 370/389 |
| 2005/0108377 | A1* | 5/2005 | Lee | | H04L 63/1408 |
| | | | | | 709/223 |
| 2006/0083231 | A1* | 4/2006 | Jeffay | | H04L 43/026 |
| | | | | | 370/389 |
| 2006/0149524 | A1* | 7/2006 | Kalyanaraman | | G06F 17/5022 |
| | | | | | 703/13 |
| 2007/0074288 | A1* | 3/2007 | Chang | | H04L 43/028 |
| | | | | | 726/22 |
| 2007/0147271 | A1* | 6/2007 | Nandy | | H04L 41/0896 |
| | | | | | 370/254 |
| 2008/0056131 | A1* | 3/2008 | Balakrishnan | | H04L 12/2697 |
| | | | | | 370/232 |
| 2008/0267065 | A1* | 10/2008 | Balakrishnan | | H04L 43/50 |
| | | | | | 370/230.1 |
| 2009/0043486 | A1* | 2/2009 | Yang | | G01C 21/3492 |
| | | | | | 701/117 |
| 2009/0198559 | A1 | 8/2009 | Wang et al. | | |
| 2010/0157841 | A1* | 6/2010 | Puthenpura | | H04L 41/0896 |
| | | | | | 370/253 |
| 2011/0170433 | A1* | 7/2011 | Scobbie | | H04L 43/0829 |
| | | | | | 370/252 |
| 2013/0060554 | A1* | 3/2013 | Aparicio | | H04L 41/145 |
| | | | | | 703/18 |

OTHER PUBLICATIONS

He, Jurrfeng, et al., "Network Traffic Prediction Based on a Periodic Traffic Model", Computer Applications, vol. 23, No. 10, Oct. 2003, 14 pages.

Gu, Xiaoming, et al., "Traffic Simulation and Modeling of IP Network", Systems Engineering and Electronics, May 2004, vol. 26, No. 5, p. 652-653, 681.

Liu, Xiaojing, et al., "Application of OPNET in Network Projection and Design", Microcomputer Information, Feb. 2006, vol. 22, No. 2-3, p. 104-106.

Alessio Botta, et al., "Multi-protocol and Multi-platform Traffic Generation and Measurement", 2 pages.

* cited by examiner

METHOD AND APPARATUS FOR NETWORK TRAFFIC SIMULATION

CROSS-REFERENCE TO RELATED APPLICATIONS

This application is a continuation of International Application No. PCT/CN2011/073333, filed on Apr. 26, 2011, which is hereby incorporated by reference in its entirety.

TECHNICAL FIELD

Embodiments of the present invention relate to communications technologies, and in particular, to a method and an apparatus for network traffic simulation.

BACKGROUND

At present, an application range of a network emulation technology is mainly design, planning, operation, and maintenance of various IP networks. The network emulation technology may evaluate performance of an existing IP network, perform configuration error validation, and perform planning before optimization and upgrading, and may further perform emulation design on a next-generation IP network.

However, in the prior art, network traffic can only be simulated by using a specified traffic model and according to a specific traffic characteristic, thereby causing reduction of flexibility and an emulation degree of traffic simulation.

SUMMARY

Embodiments of the present invention provide a method and an apparatus for network traffic simulation, which are used to improve flexibility and an emulation degree of traffic simulation.

An embodiment of the present invention provides a method for network traffic simulation, where the method includes:

obtaining traffic information and user requirement information of a to-be-simulated IP network;

analyzing the traffic information to generate a traffic characteristic;

according to correspondence between user requirement information and traffic models, obtaining a traffic model corresponding to the user requirement information; and generating, through simulation, traffic of the to-be-simulated IP network according to the traffic characteristic and the traffic model.

An embodiment of the present invention further provides an apparatus for network traffic simulation, where the apparatus includes:

an information obtaining unit, configured to obtain traffic information and user requirement information of a to-be-simulated IP network;

an information analyzing unit, configured to analyze the traffic information to generate a traffic characteristic;

a model obtaining unit, configured to, according to correspondence between user requirement information and traffic models, obtain a traffic model corresponding to the user requirement information; and a traffic simulating unit, configured to generate, through simulation, traffic of the to-be-simulated IP network according to the traffic characteristic and the traffic model.

It can be known from the foregoing technical solutions that, in the embodiments of the present invention, the corresponding traffic model is obtained according to the obtained user requirement information, and the corresponding traffic characteristic is generated according to the obtained traffic information of the to-be-simulated IP network, so that the traffic of the to-be-simulated IP network can be generated through simulation, and a problem in the prior art caused by that network traffic can only be simulated by using a specified traffic model and according to a specific traffic characteristic can be avoided, thereby improving the flexibility and the emulation degree of traffic simulation.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description are some embodiments of the present invention, and persons of ordinary skill in the art may further derive other drawings according to these accompanying drawings without creative efforts.

DETAILED DESCRIPTION

To make objectives, technical solutions, and advantages of embodiments of the present invention more comprehensible, the following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
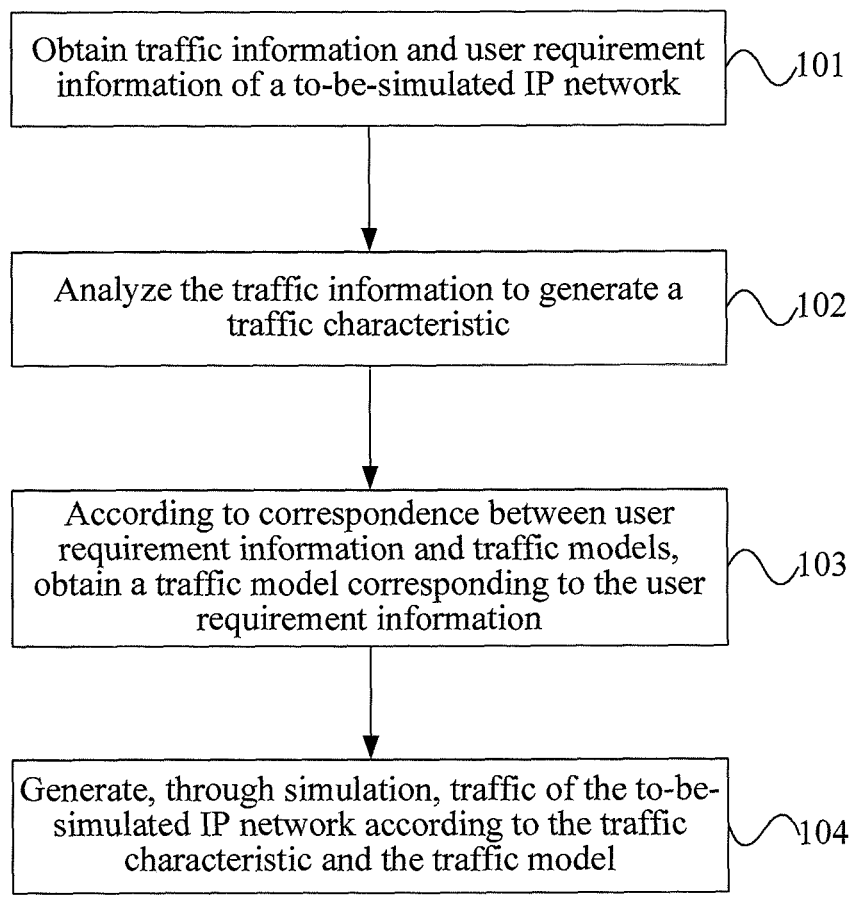
FIG. 1 is a schematic flow chart of a method for network traffic simulation according to Embodiment 1 of the present invention.

FIG. 1 is a schematic flow chart of a method for network traffic simulation according to Embodiment 1 of the present invention. As shown in FIG. 1, the method for network traffic simulation in this embodiment may include the following steps:

Step 101: Obtain traffic information and user requirement information of a to-be-simulated IP network.

Specifically, the user requirement information in this step may indicate a requirement of a user for a characteristic matching degree of generated simulated traffic and real traffic and a requirement for complexity of an algorithm for generating traffic through simulation, and may specifically include at least one piece of the following information:

a first-order statistical property of generated simulated traffic approximates to that of real traffic;

a second-order statistical property of generated simulated traffic approximates to that of real traffic;

a high-order multi-scale statistical property of generated simulated traffic approximates to that of real traffic;

complexity of an algorithm for generating traffic through simulation is high or low; and calculation time of generated simulated traffic is long or short.

Furthermore, before this step, the method for network traffic simulation in this embodiment may further include a step of measuring traffic of the to-be-simulated IP network to generate the traffic information. Specifically, at least one of an active measurement manner (such as an active detection manner) or a passive measurement manner (such as a port mirroring manner and an optical splitting manner) may be adopted to measure the traffic of the to-be-simulated IP network.

Step 102: Analyze the traffic information to generate a traffic characteristic.

Specifically, at least one of the following analyses may be performed on the traffic information:

(1) Perform a first-order statistical analysis on the traffic information.

The first-order statistical analysis may be used to analyze attributes of the IP network, such as traffic distribution, a time series, and a mean value of various characteristics.

(2) Perform a second-order statistical analysis on the traffic information.

The second-order statistical analysis may be used to analyze attributes of the IP network, such as a traffic variance and a time correlation.

(3) Perform a high-order multi-scale statistical analysis on the traffic information.

The high-order statistical analysis may be used to analyze macroscopic and microscopic attributes of the traffic of the IP network in different time scales.

Step 103: According to correspondence between user requirement information and traffic models, obtain a traffic model corresponding to the user requirement information.

The correspondence between user requirement information and traffic models may be as shown in Table 1.

TABLE 1

Correspondence between user requirement information and traffic models

| User Requirement Information | Traffic Model |
| --- | --- |
| User requirement information 1 | Traffic model A |
| User requirement information 2 | Traffic model B |
| User requirement information 3 | Traffic model C |
| User requirement information 4 | Traffic model D |
| User requirement information 5 | Traffic model E |
| User requirement information 6 | Traffic model F |

The foregoing traffic models (A to F) may include, but are not limited to, a Markov model, a multi-fractal wavelet model or a classic statistical model (such as a Poisson distribution model and a Pareto distribution model).

It should be noted that, execution order of the foregoing step 102 and step 103 in this embodiment is not fixed, and is not limited in this embodiment.

Step 104: Generate, through simulation, traffic of the to-be-simulated IP network according to the traffic characteristic and the traffic model.

Specifically, in this step, parameter estimation may specifically be performed on the traffic characteristic according to the traffic model to determine a parameter value of the traffic model, and then the traffic model with the determined parameter value is used to generate, through simulation, traffic of the to-be-simulated IP network.

In this embodiment, the corresponding traffic model is obtained according to the obtained user requirement information, and the corresponding traffic characteristic is generated according to the obtained traffic information of the to-be-simulated IP network, so that the traffic of the to-be-simulated IP network can be generated through simulation, and a problem in the prior art caused by that network traffic can only be simulated by using a specified traffic model and according to a specific traffic characteristic can be avoided, thereby improving flexibility and an emulation degree of traffic simulation.

Figure 2:
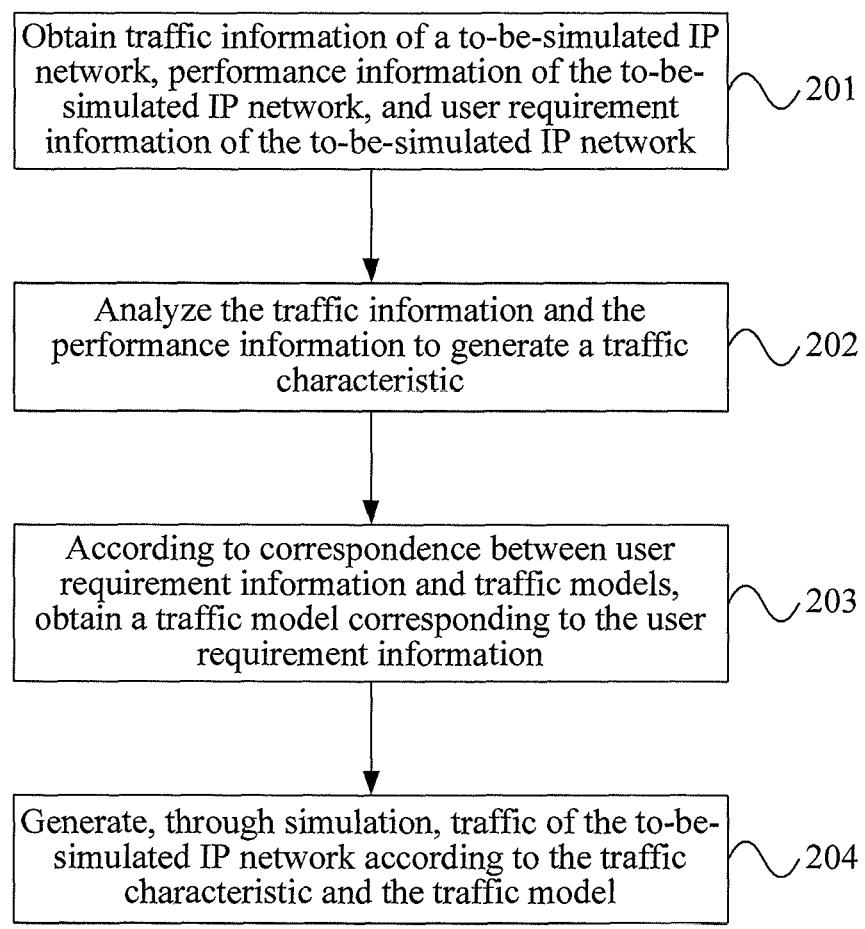
FIG. 2 is a schematic flow chart of a method for network traffic simulation according to Embodiment 2 of the present invention.

FIG. 2 is a schematic flow chart of a method for network traffic simulation according to Embodiment 2 of the present invention. Compared with the previous embodiment, the method for network traffic simulation in this embodiment may further include steps of obtaining performance information of a to-be-simulated IP network and analyzing the traffic information and the performance information to generate a traffic characteristic. As shown in FIG. 2, the method for network traffic simulation in this embodiment may include the following steps:

Step 201: Obtain traffic information of a to-be-simulated IP network, performance information of the to-be-simulated IP network, and user requirement information of the to-be-simulated IP network.

Furthermore, compared with the previous embodiment, before this step, the method for network traffic simulation in this embodiment may further include a step of measuring performance of the to-be-simulated IP network to generate the performance information. Specifically, an active measurement manner (such as an active detection manner) and/or a passive measurement manner (such as a port mirroring manner and an optical splitting manner) may be adopted to measure the performance of the to-be-simulated IP network.

Step 202: Analyze the traffic information and the performance information to generate a traffic characteristic.

Specifically, at least one of the following analyses may be performed on the traffic information and the performance information:

(1) Perform a first-order statistical analysis on the traffic information and the performance information.

The first-order statistical analysis may be used to analyze attributes of the IP network, such as traffic and performance distribution, a time series, and a mean value of various characteristics.

(2) Perform a second-order statistical analysis on the traffic information and the performance information.

The second-order statistical analysis may be used to analyze attributes of the IP network, such as traffic and performance variances and a time correlation.

(3) Perform a high-order multi-scale statistical analysis on the traffic information and the performance information.

The high-order statistical analysis may be used to analyze macroscopic and microscopic attributes of the traffic and the performance of the IP network in different time scales.

Step 203: According to correspondence between user requirement information and traffic models, obtain a traffic model corresponding to the user requirement information.

The correspondence between user requirement information and traffic models may be as shown in Table 1, and specific content is not repeatedly described.

Step 204: Generate, through simulation, traffic of the to-be-simulated IP network according to the traffic characteristic and the traffic model.

Specifically, in this step, parameter estimation may specifically be performed on the traffic characteristic according to the traffic model to determine a parameter value of the traffic model, and then the traffic model with the determined parameter value is used to generate, through simulation, traffic of the to-be-simulated IP network.

In this embodiment, the corresponding traffic model is obtained according to the obtained user requirement information, and the corresponding traffic characteristic is generated according to the obtained traffic information and performance information of the to-be-simulated IP network, so that the traffic of the to-be-simulated IP network can be generated through simulation, and a problem in the prior art caused by that network traffic can only be simulated by using a specified traffic model and according to a specific traffic characteristic can be avoided, thereby improving flexibility and an emulation degree of traffic simulation.

It should be noted that, for brevity, the foregoing method embodiments are described as a series of action combinations. However, persons skilled in the art should understand that the present invention is not limited to the described action order, because according to the present invention, some steps may adopt other order or occur simultaneously. Moreover, persons skilled in the art should also understand that the embodiments described in the specification all belong to exemplary embodiments, and the involved actions and modules are not necessarily required by the present invention.

In the foregoing embodiments, descriptions of the embodiments have respective focuses. For a part that is not described in detail in a certain embodiment, reference may be made to related descriptions in another embodiment.

Figure 3:
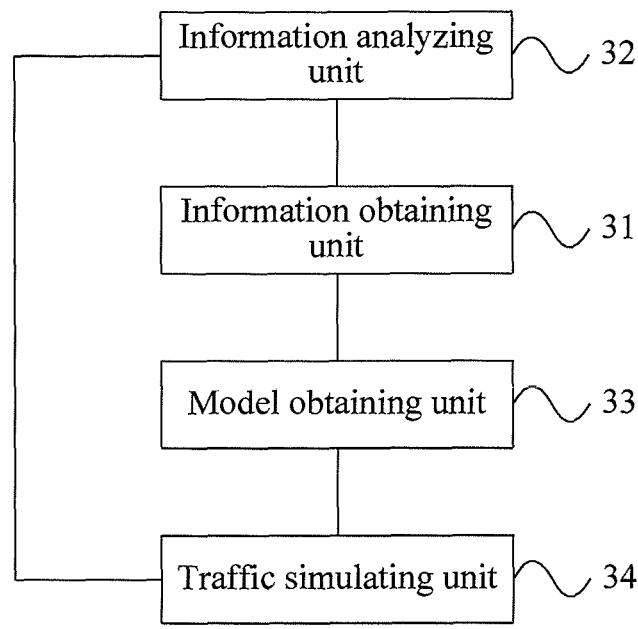
FIG. 3 is a schematic structural diagram of an apparatus for network traffic simulation according to Embodiment 3 of the present invention.

FIG. 3 is a schematic structural diagram of an apparatus for network traffic simulation according to Embodiment 3 of the present invention. As shown in FIG. 3, the apparatus for network traffic simulation in this embodiment may include an information obtaining unit 31, an information analyzing unit 32, a model obtaining unit 33 and a traffic simulating unit 34. The information obtaining unit 31 is configured to obtain traffic information and user requirement information of a to-be-simulated IP network; the information analyzing unit 32 is configured to analyze the traffic information obtained by the information obtaining unit 31 to generate a traffic characteristic; the model obtaining unit 33 is configured to, according to correspondence between user requirement information and traffic models, obtain a traffic model corresponding to the user requirement information obtained by the information obtaining unit 31; and the traffic simulating unit 34 is configured to, according to the traffic characteristic generated by the information analyzing unit 32 and the traffic model obtained by the model obtaining unit 33, generate, through simulation, traffic of the to-be-simulated IP network.

Specifically, the user requirement information in this step may indicate a requirement of a user for a characteristic matching degree of generated simulated traffic and real traffic and a requirement for complexity of an algorithm for generating traffic through simulation, and may specifically include at least one piece of the following information:

a first-order statistical property of generated simulated traffic approximates to that of real traffic;

a second-order statistical property of generated simulated traffic approximates to that of real traffic;

a high-order multi-scale statistical property of generated simulated traffic approximates to that of real traffic;

complexity of an algorithm for generating traffic through simulation is high or low; and calculation time of generated simulated traffic is long or short.

The methods in Embodiments 1 and 2 of the present invention may both be implemented by the apparatus for network traffic simulation provided by the embodiment of the present invention.

Specifically, the traffic simulating unit 34 in this embodiment may specifically perform parameter estimation on the traffic characteristic according to the traffic model to determine a parameter value of the traffic model, and use the traffic model with the determined parameter value to generate, through simulation, traffic of the to-be-simulated IP network.

Figure 4:
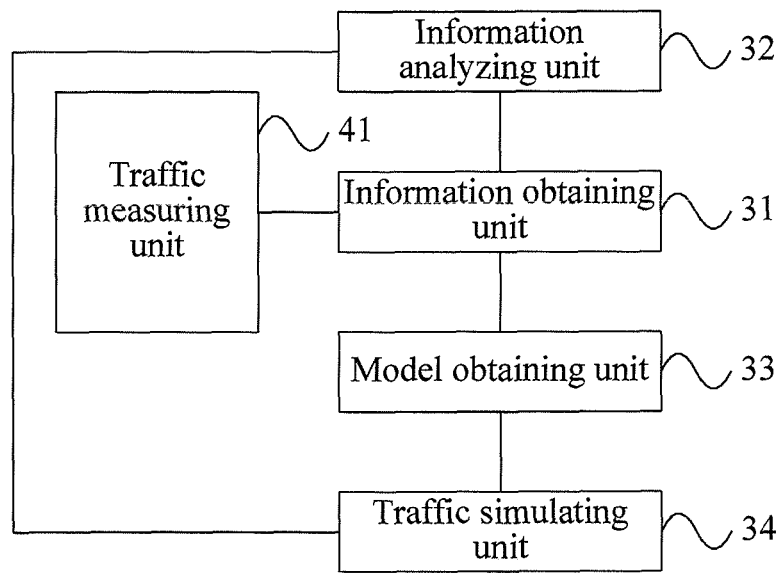
FIG. 4 is another schematic structural diagram of the apparatus for network traffic simulation according to Embodiment 3 of the present invention.

Furthermore, as shown in FIG. 4, the apparatus for network traffic simulation in this embodiment may further include a traffic measuring unit 41, configured to measure traffic of the to-be-simulated IP network to generate the traffic information, so as to enable the information obtaining unit 31 to obtain the traffic information. Specifically, the traffic measuring unit 41 may specifically adopt an active measurement manner and/or a passive measurement manner to measure the traffic of the to-be-simulated IP network.

Specifically, the information analyzing unit 32 may specifically be configured to perform at least one of the following:

performing a first-order statistical analysis on the traffic information;

performing a second-order statistical analysis on the traffic information; and performing a high-order multi-scale statistical analysis on the traffic information.

In this embodiment, the model obtaining unit obtains the corresponding traffic model according to the user requirement information obtained by the information obtaining unit, and the information analyzing unit generates the corresponding traffic characteristic according to the traffic information which is of the to-be-simulated IP network and is obtained by the information obtaining unit, so that the traffic simulating unit can generate, through simulation, the traffic of the to-be-simulated IP network, and a problem in the prior art caused by that network traffic can only be simulated by using a specified traffic model and according to a specific traffic characteristic can be avoided, thereby improving flexibility and an emulation degree of traffic simulation.

Figure 5:
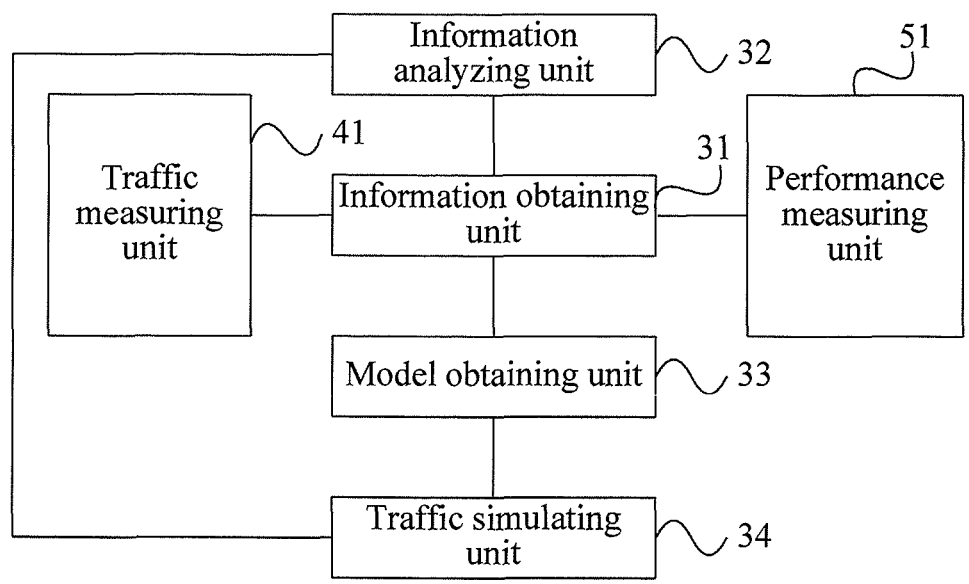
FIG. 5 is another schematic structural diagram of the apparatus for network traffic simulation according to Embodiment 3 of the present invention.

Optionally, the information obtaining unit 31 in this embodiment may further be configured to obtain performance information of the to-be-simulated IP network. Correspondingly, the information analyzing unit 32 in this embodiment may specifically be further configured to analyze the traffic information and the performance information to generate a traffic characteristic. Furthermore, as shown in FIG. 5, the apparatus for network traffic simulation in this embodiment may further include a performance measuring unit 51, configured to measure performance of the to-be-simulated IP network to generate the performance information, so as to enable the information obtaining unit 31 to obtain the performance information. Specifically, the performance measuring unit 51 may specifically adopt an active measurement manner and/or a passive measurement manner to measure the performance of the to-be-simulated IP network.

Specifically, the information analyzing unit 32 may specifically be further configured to perform at least one of the following:

performing a first-order statistical analysis on the traffic information and the performance information;

performing a second-order statistical analysis on the traffic information and the performance information; and performing a high-order multi-scale statistical analysis on the traffic information and the performance information.

In this embodiment, the model obtaining unit obtains the corresponding traffic model according to the user requirement information obtained by the information obtaining unit, and the information analyzing unit generates the corresponding traffic characteristic according to the traffic information and performance information which are of the to-be-simulated IP network and are obtained by the information obtaining unit, so that the traffic simulating unit can generate, through simulation, the traffic of the to-be-simulated IP network, and a problem in the prior art caused by that network traffic can only be simulated by using a specified traffic model and according to a specific traffic characteristic can be avoided, thereby improving flexibility and an emulation degree of traffic simulation.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions recorded in the foregoing embodiments or make equivalent replacements to part of the technical features of the technical solutions recorded in the foregoing embodiments; however, these modifications or replacements do not make the essence of the corresponding technical solutions depart from the spirit and scope of the technical solutions of the embodiments of the present invention.

What is claimed is:

1. A method for network traffic simulation, the method comprising:

obtaining traffic information and user requirement information of a to-be-simulated IP network;

analyzing the traffic information to generate a traffic characteristic, including:

performing a first-order statistical analysis on at least a portion of the traffic information to determine attributes of the IP network including at least one of a traffic distribution and a time series, performing a second-order statistical analysis on at least a portion of the traffic information to analyze attributes of the IP network including a traffic variance and a time correlation, and performing a high-order multi-scale statistical analysis on at least a portion of the traffic information to analyze macroscopic and microscopic attributes of the traffic in different time scales, wherein the traffic characteristic is based on the first-order statistical analysis, the second order statistical analysis, and the high-order multi-scale statistical analysis;

according to correspondence between user requirement information and traffic models, the traffic models including a Markov model, a multi-fractal wavelet model, or a classic statistical model, obtaining a traffic model corresponding to the user requirement information; and generating, through simulation, traffic of the to-be-simulated IP network according to the traffic characteristic and the traffic model.

2. The method according to claim 1, the method further comprises:

measuring traffic of the to-be-simulated IP network to generate the traffic information.

3. The method according to claim 2, wherein measuring the traffic of the to-be-simulated IP network comprises:

measuring the traffic of the to-be-simulated IP network by adopting at least one of an active measurement manner or a passive measurement manner.

4. The method to claim 1, wherein the high-order multi-scale statistical analysis is also performed on the performance information.

5. The method according to claim 1, the method further comprises:

obtaining performance information of the to-be-simulated IP network; and analyzing the traffic information and the performance information to generate the traffic characteristic.

6. The method according to claim 5, the method further comprises:

measuring performance of the to-be-simulated IP network to generate the performance information.

7. The method according to claim 6, wherein measuring the performance of the to-be-simulated IP network comprises:

measuring the performance of the to-be-simulated IP network by adopting at least one of an active measurement manner or a passive measurement manner.

8. The method according to claim 5, wherein the first-order statistical analysis and the second order statistical analysis are also performed on the performance information.

9. A physical apparatus for network traffic simulation, comprising:

a processor;

an information obtaining unit implemented by the processor, configured to obtain traffic information and user requirement information of a to-be-simulated IP network;

an information analyzing unit implemented by the processor, configured to analyze the traffic information to generate a traffic characteristic, including:

performing a first-order statistical analysis on at least a portion of the traffic information to determine attributes of the IP network including at least one of a traffic distribution and a time series, performing a second-order statistical analysis on at least a portion of the traffic information to analyze attributes of the IP network including a traffic variance and a time correlation, and performing a high-order multi-scale statistical analysis on at least a portion of the traffic information to analyze macroscopic and microscopic attributes of the traffic in different time scales, wherein the traffic characteristic is based on the first-order statistical analysis, the second order statistical analysis, and the high-order multi-scale statistical analysis;

a model obtaining unit implemented by the processor, configured to, according to correspondence between user requirement information and traffic models, the traffic models including a Markov model, a multifractal wavelet model, or a classic statistical model, obtain a traffic model corresponding to the user requirement information; and a traffic simulating unit implemented by the processor, configured to generate, through simulation, traffic of the to-be-simulated IP network according to the traffic characteristic and the traffic model.

10. The apparatus according to claim 9, further comprising a traffic measuring unit implemented by the processor, configured to measure traffic of the to-be-simulated IP network to generate the traffic information, so as to enable the information obtaining unit to obtain the traffic information.

11. The apparatus according to claim 10, wherein the traffic measuring unit is configured to measure the traffic of the to-be-simulated IP network by adopting at least one of an active measurement manner or a passive measurement manner.

12. The apparatus according to claim 9, wherein the high-order multi-scale statistical analysis is also performed on the performance information.

13. The apparatus according to claim 9, wherein
the information obtaining unit is further configured to obtain performance information of the to-be-simulated IP network; and
the information analyzing unit is configured to analyze the traffic information and the performance information to generate the traffic characteristic.

14. The apparatus according to claim 13, further comprising a performance measuring unit implemented by the processor, configured to measure performance of the to-be-simulated IP network to generate the performance information, so as to enable the information obtaining unit to obtain the performance information.

15. The apparatus according to claim 14, wherein the performance measuring unit is configured to measure the performance of the to-be-simulated IP network by adopting at least one of an active measurement manner or a passive measurement manner.

* * * * *